Figure 1:
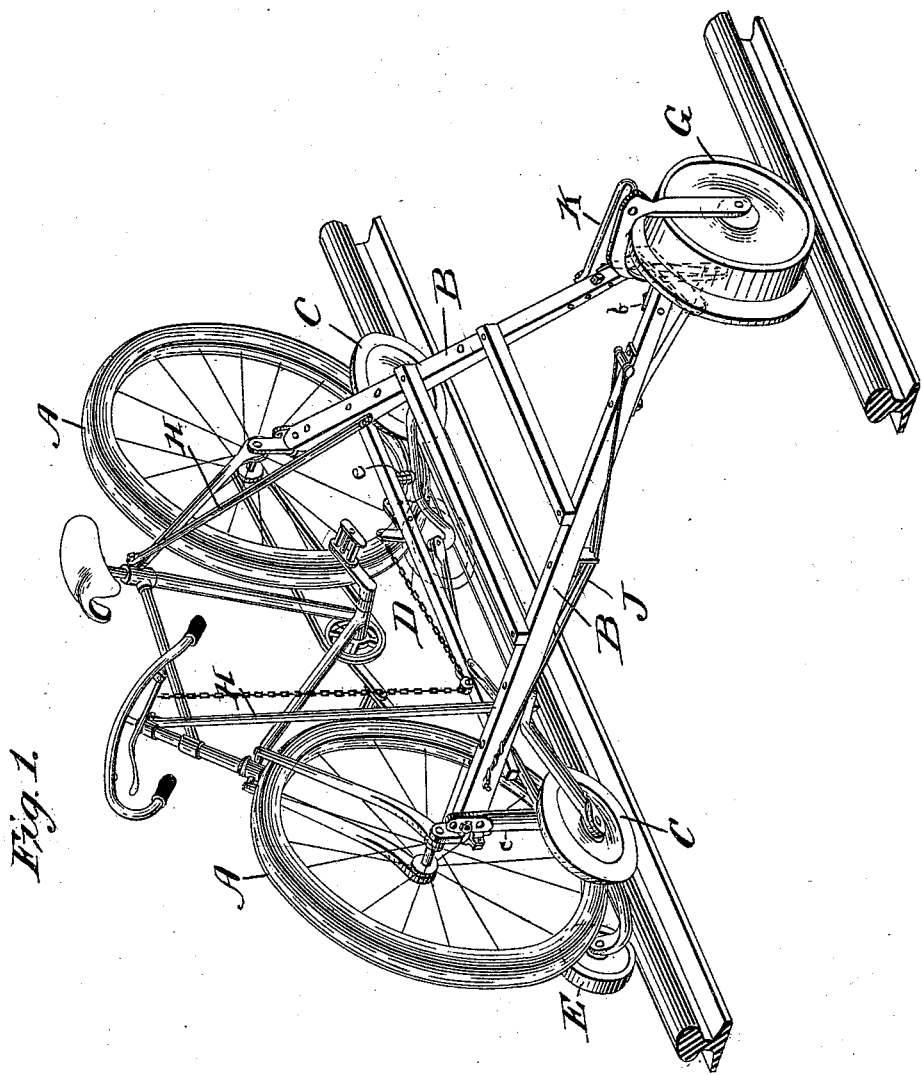

(No Model.) 2 Sheets—Sheet 1.
L. J. PARKER.
RAILROAD ATTACHMENT FOR SAFETY BICYCLES.

No. 551,834. Patented Dec. 24, 1895.

Witnesses
Samuel M Dyer

Inventor.
Lawell J Parker (No Model.) 2 Sheets—Sheet 2.
L. J. PARKER.
RAILROAD ATTACHMENT FOR SAFETY BICYCLES.
No. 551,834. Patented Dec. 24, 1895.
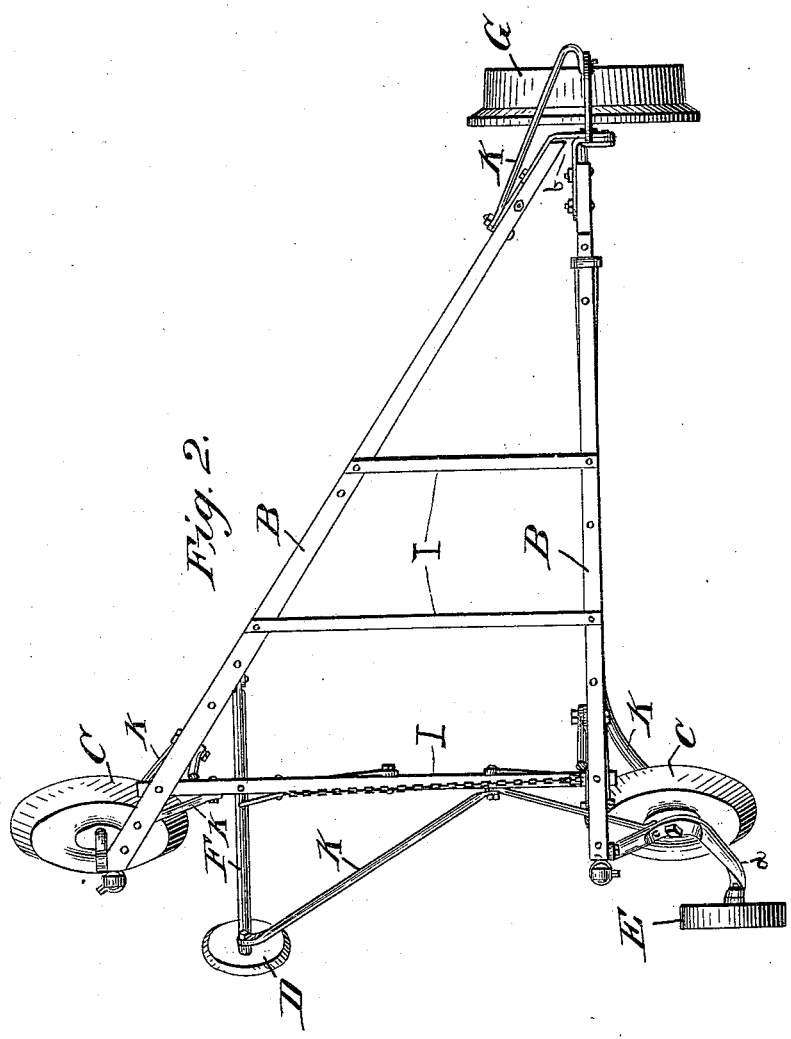
Witnesses. Inventor.

UNITED STATES PATENT OFFICE.

LAWELL J. PARKER, OF COLORADO SPRINGS, COLORADO.

RAILROAD ATTACHMENT FOR SAFETY-BICYCLES.

SPECIFICATION forming part of Letters Patent No. 551,834, dated December 24, 1895.

Application filed December 21, 1894. Serial No. 532,591. (No model.)

*To all whom it may concern:*

Be it known that I, LAWELL J. PARKER, a citizen of the United States, residing at Colorado Springs, in the county of El Paso and State of Colorado, have invented certain new and useful Improvements in a Railroad Attachment for Safety-Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an attachment by the use of which an ordinary safety-bicycle may be ridden on a railroad-track.

It consists in certain novel features hereinafter described and claimed.

In the annexed drawings, Figure 1 is a perspective view of a safety-bicycle provided with my attachment and mounted on a railroad-track. Fig. 2 is a plan view of the attachment.

A designates an ordinary safety-bicycle. Attached to the front and rear forks of the frame of the bicycle are beams B, which converge laterally from the bicycle and are joined at their outer ends by an angle-iron $b$, from which there projects a bracket or arch K in which a flange-wheel G is journaled, said wheel being adapted to run upon one of the track-rails and thereby guide the bicycle. The angle-irons can be arranged to project more or less beyond the beams and thereby accommodate the device to a track of any gage. The beams are connected at various points by transverse bars I to prevent their spreading, and their rigidity is further provided for by braces H, which extend upward from the beams to the steering-head and the saddle-post, respectively, as clearly shown in Fig. 1.

To the end of the front beam I adjustably secure a standard $c$, at the lower end of which is journaled a beveled flange-wheel C, which runs on the side of the rail and holds the bicycle in position thereon. A second flange-wheel C is carried by the rear beam and acts in all respects like the front wheel C. The standard $c$ is carried forward a short distance beyond the wheel C and is curved laterally, as at $d$, so as to extend over the track-rail in advance of the front wheel of the bicycle. On the free end of this lateral arm $d$ is a small supplemental supporting-wheel E, which is brought into play when the track is spread or a frog is to be crossed. When the rail is spread this wheel comes into contact with and rides upon the same and the bicycle-wheel is held up and prevented from dropping down between the rails. A wheel-arm F is secured to the rear beam and projects laterally therefrom beyond and under the outermost transverse bar, and is normally held up by a small coiled spring $e$, which is secured to the wheel-arm and the transverse bar, as shown. This wheel-arm is carried outward in front of the rear bicycle-wheel and has a small safety-wheel D mounted on its extremity. This safety-wheel is set at an incline and rides upon the outer side of the rail to prevent the bicycle-wheel slipping therefrom during fast riding, and will be found specially desirable on wet and slippery rails. An operating-lever M is mounted on the handle-bar of the bicycle and is connected to this safety-wheel by a chain, so that said wheel may be raised or lowered when desired.

This attachment can be readily applied to any ordinary safety-bicycle to adapt it for use upon railroad-tracks.

Having thus described my invention, what I claim, and desire to secure by Letters Patent, is—

1. An attachment for safety bicycles consisting essentially of two converging bars or beams attached to the bicycle frame, angle irons connecting the outer ends of said beams, an arched bracket projecting from the said angle irons, and a flange wheel mounted in said bracket.

2. An attachment for safety bicycles consisting essentially of two converging beams secured to the bicycle frame, a flange wheel at the outer ends of the said beams, a standard adjustably secured to the front beam, a flange wheel at the lower end of the standard, a lateral arm projecting from the standard, a safety wheel on the end of said arm, and a flange wheel mounted on the rear beam.

3. An attachment for bicycles consisting essentially of two converging beams secured to the bicycle frame, a flange wheel at the outer ends of said beams, a flange wheel carried by the front beam, a flange wheel carried by the rear beam, a wheel arm secured to the rear beam and projecting laterally from the same in advance of the rear bicycle wheel, a spring connecting the said wheel arm with the frame of the attachment, and a safety wheel on the end of the said arm.

In testimony whereof I affix my signature in presence of two witnesses.

LAWELL J. PARKER.

Witnesses:
SAMUEL M. DYER,
E. ERNEST McMAHAN.